(12) United States Patent
Mokrini et al.

(10) Patent No.: US 10,336,874 B2
(45) Date of Patent: Jul. 2, 2019

(54) CO-EXTRUDED ULTRA THIN FILMS

(71) Applicant: NATIONAL RESEARCH COUNCIL OF CANADA, Ottawa (CA)

(72) Inventors: Asmae Mokrini, Montreal (CA); Francois Vachon, Varennes (CA); Jacques Dufour, Otterburn Park (CA)

(73) Assignee: National Research Council of Canada, Ottawa (CA)

( * ) Notice: Subject to any disclaimer, the term of this patent is extended or adjusted under 35 U.S.C. 154(b) by 21 days.

(21) Appl. No.: 15/648,726

(22) Filed: Jul. 13, 2017

(65) Prior Publication Data

US 2017/0369661 A1 Dec. 28, 2017

Related U.S. Application Data

(62) Division of application No. 14/366,904, filed as application No. PCT/CA2012/001173 on Dec. 19, 2012, now Pat. No. 9,725,568.

(Continued)

(51) Int. Cl.
*C08J 5/22* (2006.01)
*B32B 7/06* (2019.01)
(Continued)

(52) U.S. Cl.
CPC ............... *C08J 5/225* (2013.01); *B29C 49/04* (2013.01); *B32B 7/06* (2013.01); *B32B 27/08* (2013.01); *B32B 27/32* (2013.01); *B32B 27/322* (2013.01); *C08K 3/013* (2018.01); *H01M 8/1039* (2013.01); *H01M 8/1069* (2013.01); *B29C 47/0007* (2013.01); *B29C 47/0021* (2013.01); *B29C 47/0026* (2013.01); *B29C 47/0092* (2013.01); *B29C 47/065* (2013.01); *B29C 48/023* (2019.02); *B29C 48/08* (2019.02); *B29C 48/10* (2019.02); *B29C 48/1474* (2019.02); *B29C 48/21* (2019.02); *B29C 2049/044* (2013.01);
(Continued)

(58) Field of Classification Search
CPC .......... C08J 5/225; B32B 27/08; B32B 27/32; B32B 27/322; B32B 7/06; H01M 8/1039; H01M 8/1069; B29C 49/04; B29C 47/0007; B29C 47/0021; B29C 47/0026; B29C 47/0092; B29C 47/065
USPC ......................................................... 521/25
See application file for complete search history.

(56) References Cited

U.S. PATENT DOCUMENTS

2005/0017397 A1* 1/2005 Silagy ................. B29C 47/0004
264/173.11

FOREIGN PATENT DOCUMENTS

| CN | 101000967 A | * | 7/2007 |
| CN | 101350416 A | * | 1/2009 |
| CN | 101721922 A | * | 6/2010 |

* cited by examiner

Primary Examiner — Michael Bernshteyn
(74) Attorney, Agent, or Firm — Jessica Smith

(57) ABSTRACT

An ion exchange resin membrane or an ion exchange precursor resin membrane having a thickness of 25 microns or less and having an orientation ratio of 1.5 or less; which may be produced by co-extruding an ion exchange precursor resin with an incompatible polymer to form a multilayer film having a layer of the ion exchange precursor resin supported on a layer of the incompatible polymer. The layer of incompatible polymer is then removed from the layer of ion exchange precursor resin to provide the ion exchange precursor resin membrane. The ion exchange precursor resin membrane may be converted to an ion exchange resin membrane by hydrolysis, and subsequent acidification if desired.

11 Claims, 8 Drawing Sheets

Related U.S. Application Data

(60) Provisional application No. 61/577,138, filed on Dec. 19, 2011.

(51) Int. Cl.

| | | |
|---|---|---|
| *B32B 27/32* | (2006.01) | |
| *H01M 8/10* | (2016.01) | |
| *B29C 47/00* | (2006.01) | |
| *C08K 3/013* | (2018.01) | |
| *B32B 27/08* | (2006.01) | |
| *H01M 8/1039* | (2016.01) | |
| *H01M 8/1069* | (2016.01) | |
| *B29C 49/04* | (2006.01) | |
| *B29C 48/08* | (2019.01) | |
| *B29C 48/10* | (2019.01) | |
| *B29C 48/21* | (2019.01) | |
| *B29C 48/00* | (2019.01) | |
| *B29C 48/14* | (2019.01) | |
| *B29C 47/06* | (2006.01) | |

(52) U.S. Cl.
CPC ..... *B29C 2791/007* (2013.01); *B32B 2250/24* (2013.01); *B32B 2250/242* (2013.01); *B32B 2250/40* (2013.01); *B32B 2307/518* (2013.01); *B32B 2307/734* (2013.01); *B32B 2457/18* (2013.01); *C08J 2327/18* (2013.01); *C08J 2329/10* (2013.01); *Y02E 60/521* (2013.01); *Y02P 70/56* (2015.11)

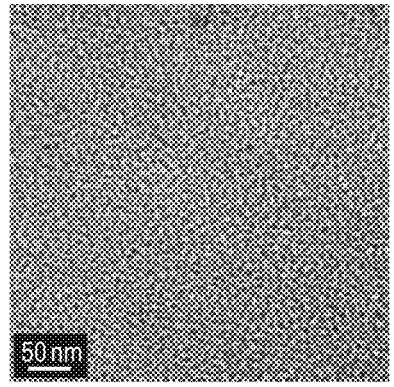
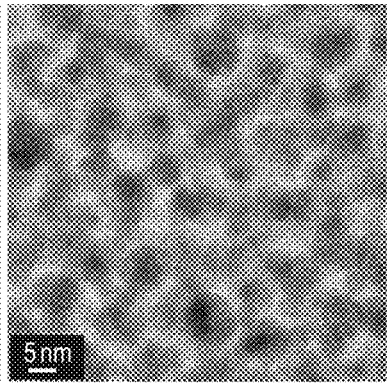
Fig. 5A          Fig. 5B
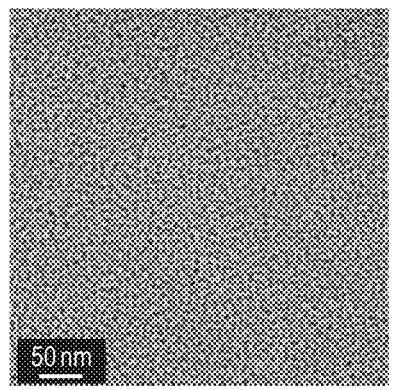
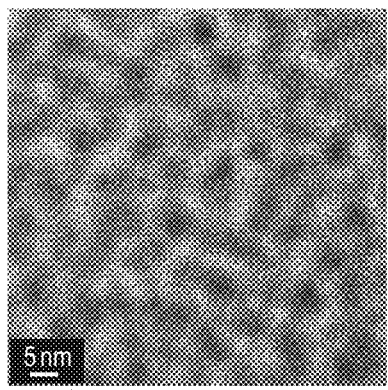
Fig. 5C          Fig. 5D
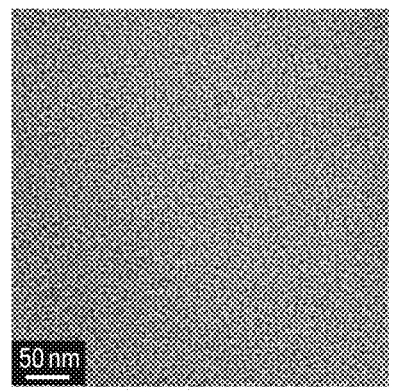
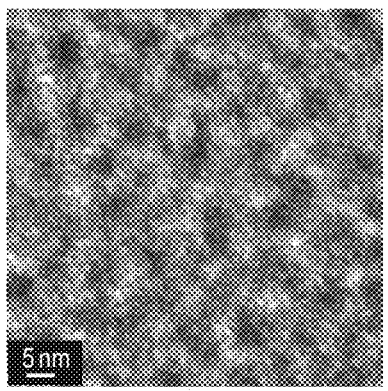
Fig. 5E          Fig. 5F

CO-EXTRUDED ULTRA THIN FILMS

CROSS-REFERENCE TO RELATED APPLICATIONS

This application is a divisional application of U.S. patent application Ser. No. 14/366,904, filed Jun. 19, 2014, now U.S. Pat. No. 9,725,568, which is a national stage entry of International Patent Application number PCT/CA2012/001173, filed Dec. 19, 2012, and claims the benefit of U.S. Provisional Patent Application Ser. No. 61/577,138, filed on Dec. 19, 2011, the entire contents of all of which are hereby incorporated by reference.

FIELD OF THE INVENTION

This invention relates to thin films of polymers, to processes for producing thin films and to uses of the thin films particularly in ion exchange membranes.

BACKGROUND OF THE INVENTION

Ion exchange membranes are used as solid electrolytes in electrochemical energy conversion devices such as fuel cells, in electrolyzers, in separation processes, in sensors, and in many other applications. Perfluorinated ion exchange membranes are state of the art proton exchange membranes (PEM) used as electrolytes for fuel cells. In order to produce electricity efficiently, the polymer electrolyte membrane of a PEM fuel cell must be thin, robust, highly proton conductive, and gas impermeable. Such membranes are generally prepared by solution or dispersion casting of the acid form of the ionomer or by melt-extrusion of a precursor polymer containing sulfonyl halide protective groups that have to be hydrolyzed and acid-exchanged after melt-processing.

Extruded membranes have already proven to have a much higher mechanical and chemical durability in a fuel cell than solution-cast membranes (Lai 2009). The melt-processes are scalable to high volume production, representing significant reduction in manufacturing cost and provide robust self-reinforced membranes. Extrusion by melt-casting has been used to prepare proton exchange membranes, available commercially as Nafion™ N-117, Nafion™ N-115, Nafion™ N-1135, Nafion™ N-112, and Nafion™ 111-IP with thicknesses of 183, 127, 89, 51 and 25 microns, respectively. These extruded membranes also suffer from anisotropy in their properties in general, that may cause a premature failure when submitted to humidity cycling in a fuel cell. Extruded membranes are prototyped using a melt-casting process that generates strong orientation in the machine direction responsible for the anisotropy. Furthermore the extrusion process by melt-casting, does not allow the manufacturing of membranes thinner than 25 microns without compromising thickness uniformity.

There remains a need for durable, low-cost proton exchange membranes with reduced thickness that may reduce ohmic resistance in a fuel cell and improve the overall performance.

SUMMARY OF THE INVENTION

In one aspect of the invention, there is provided a process for producing an ion exchange precursor resin membrane comprising: co-extruding an ion exchange precursor resin with an incompatible polymer to form a multilayer film having a layer of the ion exchange precursor resin supported on a layer of the incompatible polymer; and, removing the layer of incompatible polymer from the layer of ion exchange precursor resin to provide the ion exchange precursor resin membrane.

In another aspect of the present invention, there is provided a multilayer film comprising a layer of an ion exchange precursor resin supported on a layer of an incompatible polymer.

In another aspect of the present invention, an ion exchange resin membrane may be produced by converting the ion exchange precursor resin membrane into the ion exchange resin membrane.

In another aspect of the present invention, there is provided an ion exchange resin membrane or an ion exchange precursor resin membrane having a uniform thickness of 25 microns or less and having an orientation ratio of 1.5 or less.

Ion exchange resins (ionomers) are polymers comprising repeat units of both neutral units and a fraction of ionized units (often no more than 15 percent). Ionomers have unique physical properties including ionic conductivity, which make them useful in a variety of electrochemical, chemical and sensing applications. Preferably, the ion exchange resin is strongly acidic, more preferably a perfluorosulfonic acid (PFSA) resin, a polystyrene sulfonate (PSS) resin or the like. PFSA resins are preferred and a particularly preferred class of PFSA resins is sulfonated tetrafluoroethylene-based fluoropolymer-copolymers. The sulfonated tetrafluoroethylene-based fluoropolymer-copolymer is preferably a perfluorosulfonic acid-polytetrafluoroethylene copolymer of Formula (I), where x, y and z represent fractional weight composition of particular moieties and are numbers between 0 and 1, where x+y+z=1. Copolymers of Formula (I) are known under the trade name Nafion™

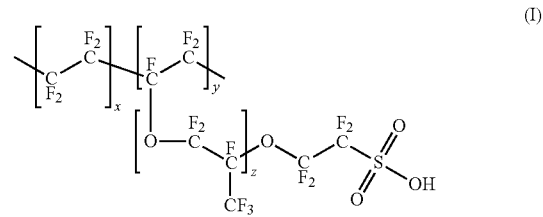

Ion exchange resins have a fraction of ionized units. The ionized units generally comprise one or more acid groups, for example sulfonic acid groups, phosphonic acid groups, carboxylic acid groups, etc. Preferably, the acid group is a sulfonic acid group. Ion exchange precursor resins are non-ionic forms of the ion exchange resins in which the acid groups are protected by a protecting group. Protecting groups include, for example sulfonyl halides (e.g. sulfonyl fluorides, sulfonyl chlorides, sulfonyl bromides). Ion exchange precursor resin membrane may be converted into ion exchange resin membranes by hydrolysis. Preferably, hydrolysis with a base (e.g. NaOH, KOH) removes the protecting group and, if desired, subsequent acidification to produce the protonated form may be accomplished by treatment with an acid (e.g. $HNO_3$, HCl, $H_2SO_4$). Activation of the protonated form of the ion exchange resin membrane may be accomplished by generally known methods.

Ion exchange precursor resins may be utilized as such in the process or may be formulated as a composite of the ion exchange precursor resin with filler, a blend of ion exchange precursor resin with other polymers or ionomers, or a multilayered structure combining any of the above. Where a composite comprising filler is utilized, the filler may be, for example, an inorganic filler such as a metal oxide (e.g. $TiO_2$, $SiO_2$, etc.), a manganese-based compound, a cerium-based compound, an inorganic filler grafted with one or more functional moieties, or a mixture thereof. The filler is preferably a nano-scale filler and the composite a nanocomposite. Nano-scale fillers have an average particle size in a range of about 1 nm to about 900 nm. Where a multilayered structure is utilized, the layers are generally compatible forming sufficiently strong interlayer bonds that delaminating is avoided when the layer of incompatible polymer is removed from the layer of ion exchange precursor resin during the process.

Since the rheological and intrinsic properties of ion exchange precursor resins do not generally allow direct extrusion (e.g. by melt-blowing) into thin membranes, a second polymer incompatible with the ion exchange precursor resin is used as a support material in a co-extrusion process. The incompatible polymer is a polymeric material that does not form a strong bond with the ion exchange precursor resin. This permits ready removal of the layer of incompatible polymer from the layer of ion exchange precursor resin after formation of the co-extruded multilayer film since the two layers do not form a strong interlayer bond. At least one layer of incompatible polymer is used to provide support for the layer of ion exchange precursor resin. If two layers of incompatible polymer are utilized, the layer of ion exchange precursor resin can be sandwiched between the layers of incompatible polymers. This would form a three-layered structure. It is possible to have more than one layer of ion exchange precursor resin, in which case two or more layers of incompatible polymer would be needed to separate and support the layers of ion exchange precursor resin. Where two or more layers of incompatible polymer are utilized, the incompatible polymers forming individual layers may be the same or different. Further, where two or more layers of ion exchange precursor resin are utilized, the ion exchange precursor resins forming individual layers may be the same or different.

The incompatible polymer preferably has a melting temperature less than the melting temperature of the ion exchange precursor resin. Preferred incompatible polymers are hydrophobic polymers or chemically inert polymers with very low surface energy. Polyolefins are particularly preferred. Polyolefins include, for example, polyethylenes, polypropylenes and polyisoprenes.

Co-extrusion may be accomplished by any suitable method. A number of methods are known in the art, for example, blown film extruding (e.g. melt-blowing) and sheet flat die extrusion. Preferably, co-extrusion is accomplished by melt-blowing. In one embodiment, the process permits melt-blowing of a continuous multilayered cylinder, which can then be flattened and drawn through nip rolls to a winder. A cutting device may be used before winding to split the cylinder into two sheets that can be then wound to produce finished rolls of films. Removal of the incompatible polymer layer from the ion exchange precursor resin layer may be accomplished by any suitable method. Preferably, the incompatible polymer layer is peeled away from the ion exchange precursor resin layer. The process of the present invention advantageously allows continuous prototyping of a uniform multilayer film, where the layer or layers of the incompatible polymer are removed easily to recover the ion exchange precursor resin membrane. Furthermore, material wasted, due to end effects such as edge trimming to eliminate the edges where the gauge consistency is poor, is reduced as the present process reduces thickness variations that can result from flat die film extrusion.

The process results in a very thin uniform membrane of ion exchange precursor resin and thus a very thin uniform membrane of ion exchange resin once the ion exchange precursor resin membrane is converted, in comparison to materials currently commercially available. Membrane thickness in a range of from more than 200 microns down to about 3 microns is possible, for example 3-200 microns, or 5-100 microns. It is a specific advantage of the present invention that a uniform membrane having a thickness of less than about 25 microns is possible, for example 3-25 microns, or 5-25 microns. Ion exchange resin membranes having thicknesses less than 25 microns have been hitherto unavailable commercially. Further, the process of the present invention can result in large area, biaxially oriented membranes of the present invention having good dimensional stability, reduced anisotropy and reduced gas permeability. Dimensional stability can be expressed as wet/dry volume change and membranes of the present invention can have wet/dry volume changes of about 75% or less, for example in a range of about 27% to about 75% or in a range about 27% to about 35%. Anisotropy can be expressed in terms of orientation ratio (OR) and membranes of the present invention can have orientation ratios of 1.5 or less, for example in a range of 1 to 1.5 or in a range 1 to 1.2. Furthermore, the membranes are unaffected by removal of the layers of incompatible polymers and the morphology of the membranes advantageously reduces fuel cross-over in the membranes when they are used in fuel cells.

Ion exchange resin membranes of the present invention may be used in energy conversion electrochemical devices (e.g. fuel cells), in electrolyzers (e.g. for hydrogen generation), in separation processes, in sensors, and in many other applications involving ion exchange membranes. The membranes are particularly useful as electrolytes in proton exchange membrane fuel cells (PEMFC).

Further features of the invention will be described or will become apparent in the course of the following detailed description.

BRIEF DESCRIPTION OF THE DRAWINGS

In order that the invention may be more clearly understood, embodiments thereof will now be described in detail by way of examples, with reference to the accompanying drawings, in which:

FIGS. 5A, 5B, 5C, 5D, 5E, and 5F depict TEM images on lead acetate stained membranes, where FIGS. 5A and 5B are for a solution-cast NRE-211 membrane, FIGS. 5C and 5D are for a melt extruded Nafion™ R-1000 membrane and FIGS. 5E and 5F are for a melt blown Nafion™ R-1000 membrane;

DESCRIPTION OF PREFERRED EMBODIMENTS

Materials:

For the Examples described herein, the precursor form of Nafion™, a perfluorosulfonic acid (PFSA) copolymer in the sulfonyl fluoride form with an Ion Exchange capacity IEC=1 mmol/g was used as ionomeric material (grade R-1000 purchased from Ion Power). For nanocomposite systems, fumed silica nanoparticles with a surface area of 380 $m^2/g$ were used as inorganic filler (grade CAB-O-SIL EH-5 purchased from Cabot). A branched low density polyethylene LDPE (Novapol™ LF-Y918-A) with MFI=0.75 g/10 min at 190° C./2.16 kg was the incompatible polymer used as a support material for the external layers.

Rheology:

To determine melt viscosities of polymeric materials, dynamic rheological measurements were performed in an ARES (Advance Rheometric Expansion System) rotational rheometer in dynamic mode, using 25-mm diameter parallel plates in oscillatory shear mode under dry nitrogen atmosphere at T=240° C. Prior to testing, samples were dried 24 h under active vacuum at 60° C. The test comprises a frequency sweep over a range spanning from 100 down to 0.1 rad/s. Small deformations (10% or 15%) oscillatory motions were imposed on the samples for all time and frequency sweeps to avoid any irreversible damage of the structure of the material. The measurements allow to evaluate the response of the materials tested in term of elastic or storage modulus (G'), viscous or loss modulus (G"), and the dynamic complex viscosity ($\eta^*$).

Figure 2:
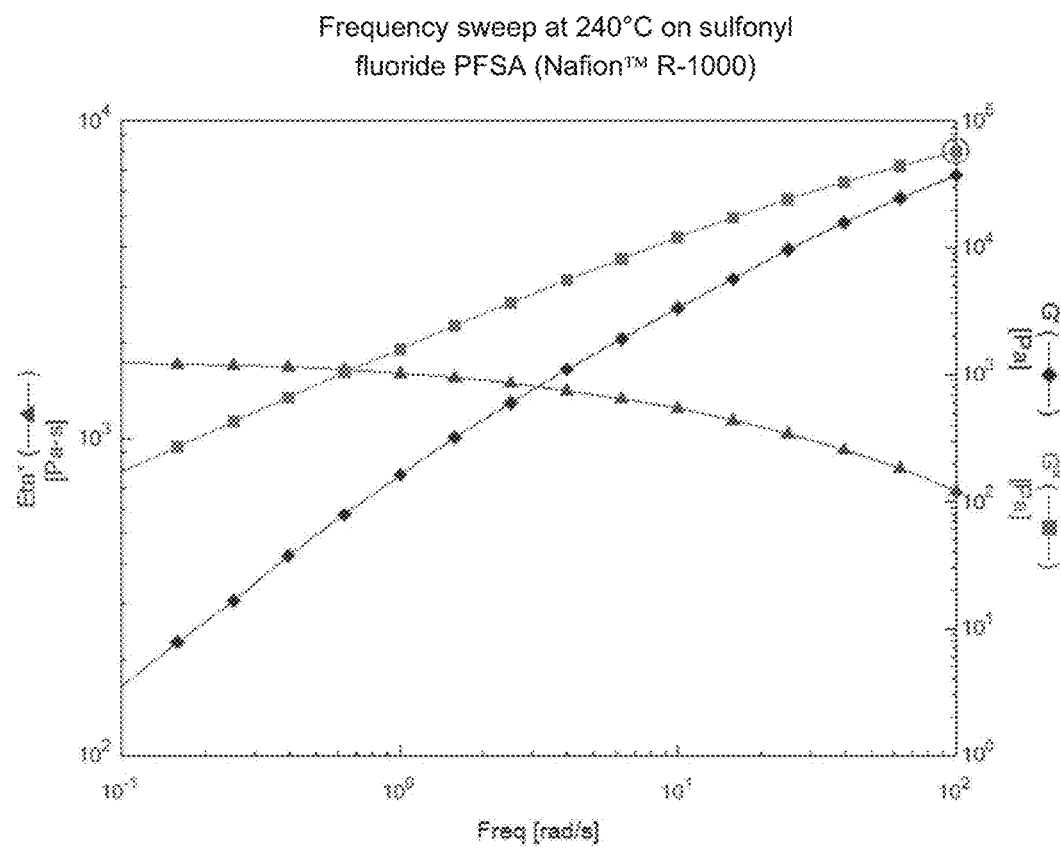
FIG. 2 is a graph depicting rheological data measured on PFSA precursor (Nafion™ R-1000) using a rotational rheometer in dynamic mode with a frequency sweep at 240° C. under dry nitrogen atmosphere.
Figure 3:
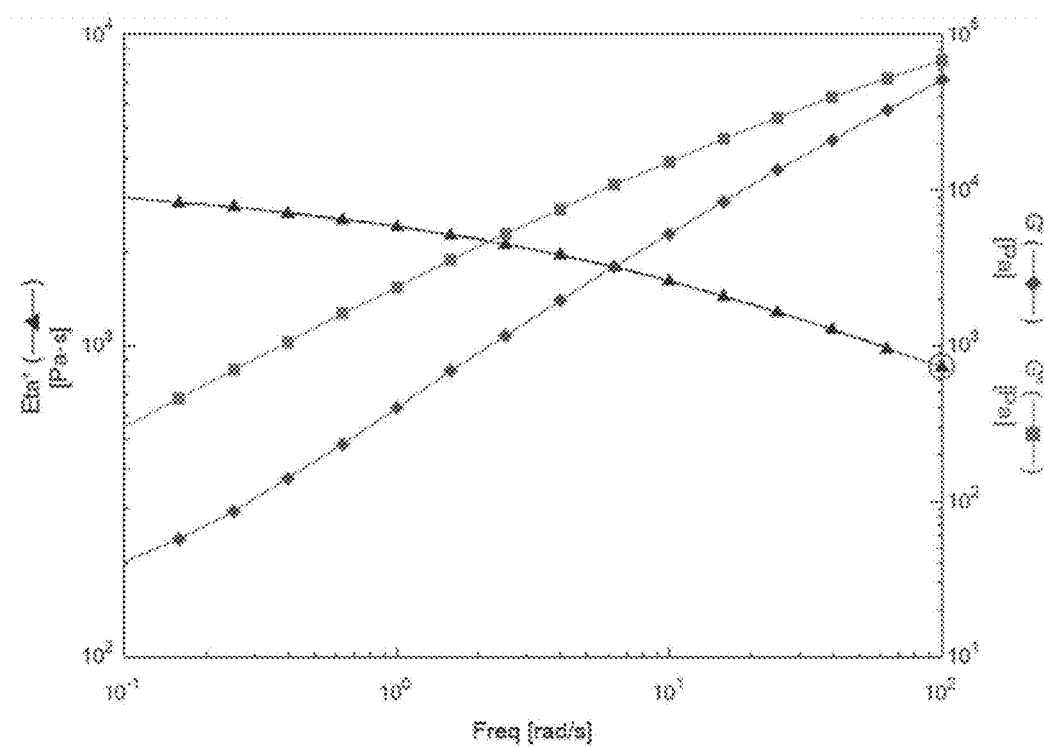
FIG. 3 is a graph depicting rheological data measured on a nanocomposite blend of PFSA precursor (Nafion™ R-1000) with 6 wt % of hydrophilic silica using a rotational rheometer in dynamic mode with a frequency sweep at 240° C. under dry nitrogen atmosphere.

Rheological measurements were carried out to characterize the viscoelastic properties of ionomeric materials used in the Examples described herein. The measurements allow the evaluation of the response of the materials tested in terms of elastic or storage modulus (G'), viscous or loss modulus (G"), and the dynamic complex viscosity (Eta* or $\eta^*$) as a function of the oscillation frequency. The results of the frequency sweep test at 240° C. are shown in FIG. 2 for PFSA precursor Nafion™ R-1000, and FIG. 3 for PFSA nanocomposite with 6 wt % EH-5 filler. For Nafion™ R-1000 the viscosity increases as the shear rate is decreased but at sufficiently low shear rates it becomes independent of shear rate and shows a linear plateau typical of Newtonian melts. For Nafion™ R-1000+6 wt % EH-5, the consequence of adding silica filler is an increase in melt viscosity and deviation from the linear viscoelastic range at low frequency. Also, the contribution of the viscous or loss modulus (G") clearly governs the rheological behaviour of both ionomeric materials in the range of frequencies investigated.

Melt-Processing:

PFSA precursor Nafion™ R-1000 pellets were directly melt-blown without previous preparation. Nanocomposites based on Nafion™ R-1000 and fumed silica EH-5 were previously compounded at 240° C. using a twin-screw extruder Leistritz Nano-16 mm.

Figure 1:
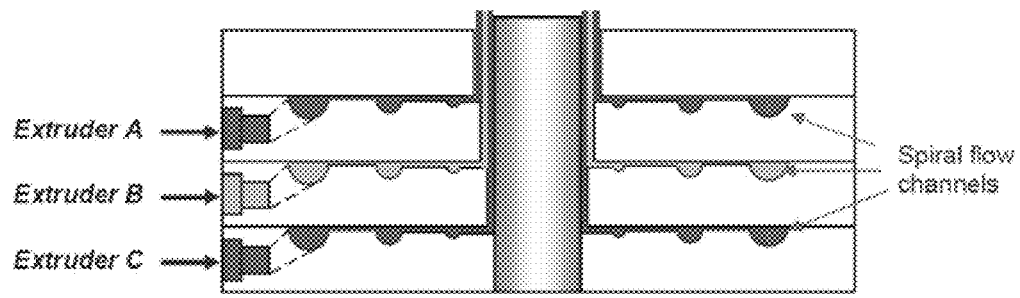
FIG. 1 depicts a schematic representation of a multilayer die used in a co-extrusion process of the present invention.

The melt-blowing experiments were performed on a LabTech multilayer co-extrusion blown film line equipped with a flat spiral die system. The multi-layer die has more than one spiral 'layer' and the die is fed from several extruders. For the examples described herein, a die fed by three melt streams was used, one melt stream of ionomeric materials coming from extruder (B) and the other two melt streams of support polymer coming from separate extruders (A and C) with a pancake die with four plates as illustrated in FIG. 1. The multilayer melt-blowing film line is equipped with three single-screw extruders LabTech 12.5 mm (type LBE 12.5/30).

Hydrolysis:

PFSA precursor thin films obtained by melt blowing are converted to the acid form by using the following process. 1) hydrolysis in a solution of 15% KOH/35% DMSO/50% de-ionized (DI) water at 80° C., followed by washing with DI water to remove all traces of un-reacted KOH. 2) Acid conversion to the $H^+$ form by exchanging the $K^+$ for $H^-$ ions using a 10 to 15% solution of nitric acid ($HNO_3$), followed by DI water washing. 3) Activation: the $H^-$ form of PFSA membranes are activated with 7.5% $H_2O_2$ at 80° C. for 1 h, soaked in DI water at 80° C. for 1 h, and finally treated with 15% $H_2SO_4$ at 80° C. for 1 h. The treated membranes are washed thoroughly with DI water.

Proton Conductivity:

In-plane proton conductivities were measured using a Solartron™ 1260. A strip of membrane (in $H^+$ form) was set between two Pt electrodes and an alternating current was passed through the plane of the sample. In the case of room temperature and liquid water conditions, the samples were immersed in Millipore water. Room temperature varied from 20° C. to 22° C. Nyquist plots between 5 MHz to 10 Hz were collected and membrane resistance was extrapolated by fitting the semi-circle part of the data to equivalent circuits. Proton conductivities were calculated from the equation below:

$$\sigma = d/RS$$

where σ is proton conductivity, d is the distance between the Pt electrodes, R is membrane resistance and S is the cross-sectional area of the sample.

Water Uptake (WU) and Volume Change (VC):

Water Uptake (WU) and Volume Change (VC) were determined as follows. After measuring mass of wet and dried membranes (in $H^+$ form), WU was calculated from the equation below:

$$WU = \frac{\text{wet mass} - \text{dry mass}}{\text{dry mass}} \times 100\%$$

The mass of dried membranes were obtained after drying them in a vacuum oven at 80° C. overnight. For VC measurements, thickness, width and length of wet and dried membranes (in $H^+$ form) were determined. Wet/dry volume change was calculated from the equation below:

$$VC = \frac{\text{Volume of wet membrane} - \text{volume of dried membrane}}{\text{Volume of dried membrane}} \times 100\%$$

Dimensions of dried membranes were obtained after drying them in a vacuum oven at 80° C. overnight.

X-Ray Diffraction Spectroscopy (XRD):

Crystalline orientation was determined from wide-angle transmission X-ray spectroscopy analysis. The equipment used was a Bruker D8 Discover X-rays goniometer equipped with a Hi-STAR™ two-dimensional area detector. The generator was set up at 45 kV and 0.65 mA.

Transmission Electron Microscopy (TEM):

Membranes in the acid form were previously immersed in a saturated lead acetate solution for 2 h at room temperature to stain the ionic domains. The samples were encapsulated in epoxy resin. The cured epoxies containing the membranes were then microtomed at room temperature into thin slices of 50 nm using a diamond knife. TEM of ultrathin sections of the samples were obtained with a Philips CM 200 instrument with an acceleration voltage of 200 kV.

Preparative Example 1: Nafion™ R-1000

Figure 4A:
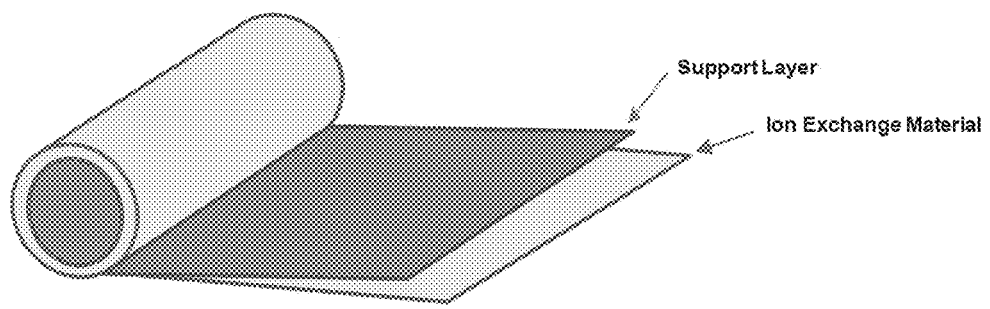
FIGS. 4A and 4B depict schematic representations of easily delaminated multilayer films obtained in accordance with a process of the present invention.
Figure 4B:
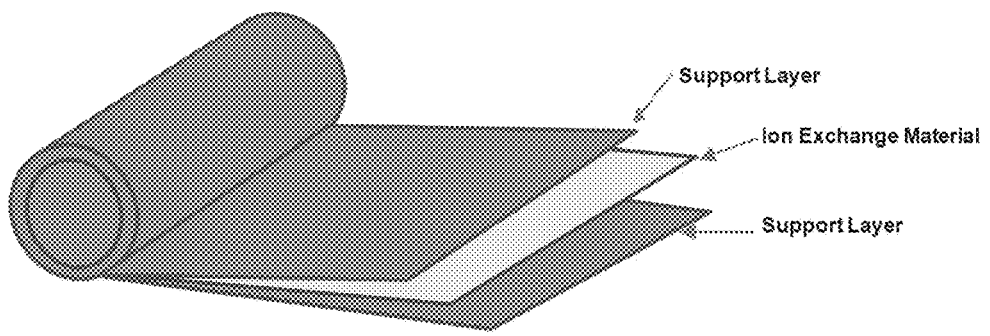

Five different multilayer films were prepared by melt-blowing co-extrusion process using Nafion™ R-1000 as ionomeric material, and LDPE as a support material. The structures obtained in this example are tri-layer films, where Nafion™ R-1000 is the mid-layer, and LDPE the external layers (FIG. 4B).

The extruder (B in FIG. 1) used for the Nafion™ R-1000 mid-layer has the following profile temperature:
Zone 1: 220° C., Zone 2: 230° C., Zone 3: 240° C., Die temperature 240° C.

The two extruders (A and C in FIG. 1) used for LDPE external layers have the following profile temperature:
Zone 1: 185° C., Zone 2: 190° C., Zone 3: 200° C., Die temperature 200° C.

Control parameters for the five different multilayer films are listed in Table 1. LDPE is incompatible with the PFSA precursor, which prevents any interfacial bonding between the layers during melt processing. The external layers are peeled easily to obtain a thin membrane of PFSA precursor. Thin membranes with different thicknesses ranging from 30 to 6 microns were obtained. Blow-up ratios (BUR) used were between 4.5 and 5.5, and draw-down ratios were between 1 and 2.

TABLE 1

Melt-Blowing Parameters for Ionomer Precursor Films

| Parameter | Film 1 | Film 2 | Film 3 | Film 4 | Film 5 |
|---|---|---|---|---|---|
| RPM extruder A (LDPE) | 106.4 | 99.5 | 106.5 | 86.9 | 86.9 |
| RPM extruder B (PFSA) | 28.4 | 20.3 | 16.8 | 9.7 | 7.1 |
| RPM extruder C (LDPE) | 130 | 100.1 | 130.1 | 104.4 | 104.4 |
| Blower speed (rpm) | 810 | 628 | 810 | 769 | 625 |
| Nip roll speed (m/min) | 1 | 1 | 1 | 1 | 1 |
| Wind-up speed (m/min) | 1.2 | 1.2 | 1.2 | 1.2 | 1.2 |
| Lay-Flat (mm) | 143 | 133 | 147 | 128 | 170 |
| Average total film thickness (μm) | 147 | 180 | 138 | 111 | 83 |
| BUR | 4.552 | 4.234 | 4.679 | 4.074 | 5.411 |
| DDR | 1.212 | 1.096 | 1.259 | 1.794 | 1.811 |
| Thickness PFSA precursor layer (μm) | 30 | 25 | 18 | 10 | 6 |

Preparative Example 2: Nafion™ R-1000+6 wt % Silica

A multilayer film was prepared by a melt-blowing process using a composite of Nafion™ R-1000+6 wt % silica as ionomeric material, and LDPE as a support material. The structure obtained in this case is a tri-layer film, where nanocomposite PFSA is the mid-layer, and LDPE the external layers (FIG. 4B).

The extruder (B in FIG. 1) used for Nafion™ R-1000+6 wt % EH-5 mid-layer has the following profile temperature:
Zone 1: 220° C., Zone 2: 230° C., Zone 3: 240° C., Die temperature 240° C.

The two extruders (A and C in FIG. 1) used for LDPE external layers have the following profile temperature:
Zone 1: 185° C., Zone 2: 190° C., Zone 3: 200° C., Die temperature 200° C.

Control parameters used for the multilayer film based on nanocomposite PFSA ionomer prepared are listed in Table 2. Even though the rheological measurements show an increase in melt viscosity and a deviation from the linear viscoelastic range at low frequency after nanoparticles incorporation, the parameters were very similar since extrusion is a high frequency process.

TABLE 2

Melt-Blowing Parameters for Nanocomposite Ionomer Precursor Film

| Parameter | Film 6 |
|---|---|
| RPM extruder A (LDPE) | 99.5 |
| RPM extruder B (PFSA) | 20.3 |
| RPM extruder C (LDPE) | 100.1 |
| Blower speed (rpm) | 614 |
| Nip roll speed (m/min) | 1 |
| Wind-up speed (m/min) | 1.2 |
| Lay-Flat (mm) | 144 |
| Average total film thickness (μm) | 176 |
| BUR | 4.584 |
| DDR | 1.035 |
| Thickness PFSA precursor layer (μm) | 25 |

Example 3: Post-Preparation Processing of Multilayer Films

The processes described in Examples 1 and 2 permit melt-blowing of a continuous multilayered cylinder. Once the cylinder is obtained, it is flattened and drawn through nip rolls to a winder. A cutting device can be used before winding to split the cylinder into two sheets that can be then wound to produce the finished rolls of films or go through chemical treatment baths in case of a continuous process.

Melt blown films were hydrolyzed by peeling one LDPE layer away from the PFSA layer and following the process outlined above. The second LDPE layer was used as a support during manipulation and chemical treatment to avoid deformation and wrinkling of the very thin films. Tests were previously done to ensure that LDPE is not affected by the chemical reagents used for the hydrolysis and activation.

Example 4: Comparisons

Examples 1 and 2 show that it is possible to produce thin uniform films from ion exchange resin precursor and composites of ion exchange resin precursor. Properties of melt-blown ion exchange resin membranes produced from the films of Example 1 (Film 2) and Example 2 (Film 6) were compared with Nafion™ NRE-211 (a solution-cast commercial ion exchange resin membrane) and with an extruded membrane prepared from Nafion™ R-1000-CS in a bench-top 5 cc microextruder (DSM) equipped with 5 cm width flat dies. The extruded Nafion™ R-1000-CS membranes were melt-cast directly from the flat die and rapidly quenched on a chill roll, producing a monolayer membrane. For the comparative study, the thickness of the membranes selected is about 25±5 microns.

Transmission Electron Microscopy (TEM) was used to examine the morphology and arrangement of the hydrophobic/hydrophilic phase separation within the ionomeric materials. High resolution TEM images on lead acetate stained membranes prepared by solution-casting (Nafion™ NRE-211), melt-extrusion (Nafion™ R-1000) and melt-blowing (Film 2) are presented in FIG. 5. Two magnifications are shown for each membrane. The fine phase separation of hydrophilic and hydrophobic domains characteristic of PFSA ionomers is visible in all cases. For solution-cast film of NRE-211 (FIG. 5A and FIG. 5B), ordered and aligned ionic domains agglomerated in dark spheres ranging from 3 to 10 nm in diameter embedded in a pale background of hydrophobic fluoropolymers can be observed. The very clear regions could suggest free volume left by solvent evaporation. In the case of the melt-extruded membrane (FIG. 5C and FIG. 5D), ionic domains are smaller and uniform (4 to 6 nm), less ordered, and more interconnected. Melt-blown membrane (FIG. 5E and FIG. 5F) shows ionic domains having even smaller size as illustrated in the high magnification image.

Figure 6:
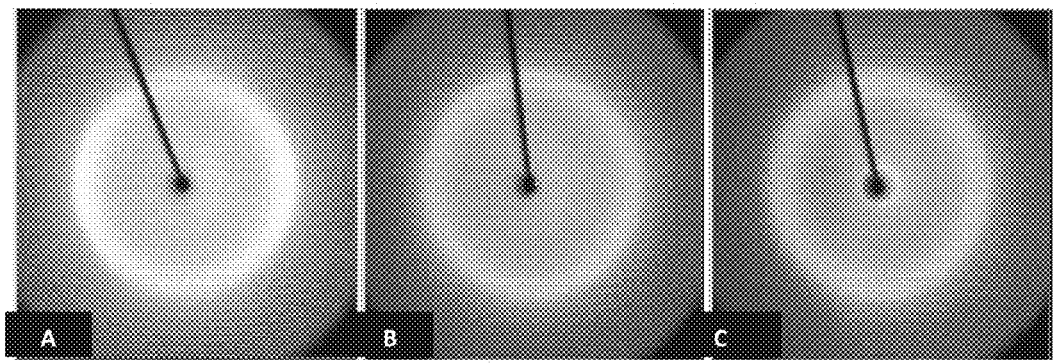
FIG. 6 depicts transmission XRD patterns obtained for A) highly oriented R-1000-CS-E, B) R-1000-CS-MB, and C) NRE-211.
Figure 7:
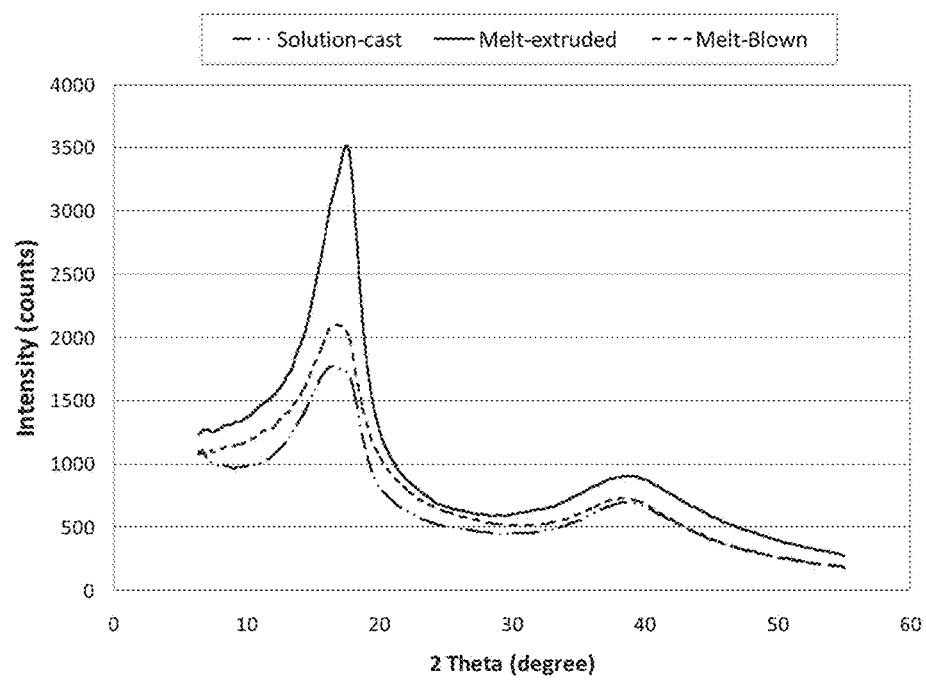
FIG. 7 depicts spectra obtained from the integration of the transmission X-ray scattering patterns obtained at an incidence angle of 90° at room temperature for solution-cast NRE-211 membrane, and extruded and melt-blown Nafion™ R-1000 membranes.

2D XRD patterns obtained in transmission mode are shown in FIG. 6, where solution cast NRE-211 and melt-blown R-1000 show an isotropic halo, while extruded R-1000 shows an anisotropic halo. The spectra in FIG. 7 were obtained by integration of the XRD patterns at an incidence angle of 90°, where spectra of extruded and melt-blown membranes are compared with the NRE-211 solution-cast membrane. All the samples show two diffraction peeks at 2 theta of 17.2° (100) and 39.6° (101) corresponding to d-spacing of 5.5 Å and 2.4 Å respectively, attributed to PTFE backbone of PFSA. A more pronounced intensity can be observed for the extruded membrane compared to the melt-blown and solution-cast NRE-211 membrane, which indicates that NRE-211 and melt-blown R-1000 (Film 2) present less anisotropy compared to the extruded-R-1000 membrane as shown from the higher intensity of the amorphous halo horizontally, where the machine direction axis is vertical. The anisotropic pattern is due to higher orientation generated from stretching in the machine direction during the cast-extrusion process to achieve the required thickness. Integrating the halo at 0° and 90° incidence angle reflects the two normals to the diffraction plane relative to the MD/TD plane. To quantify the isotropy/anisotropy of the samples, we determined an orientation ratio (OR) defined as the ratio of the intensity of the peek at 2 theta=17.2° (100) integrated at 0 and 90°. OR calculated for NRE-211, melt-blown and extruded R-1000 were 1, 1.1 and >1.5, respectively.

Figure 8:
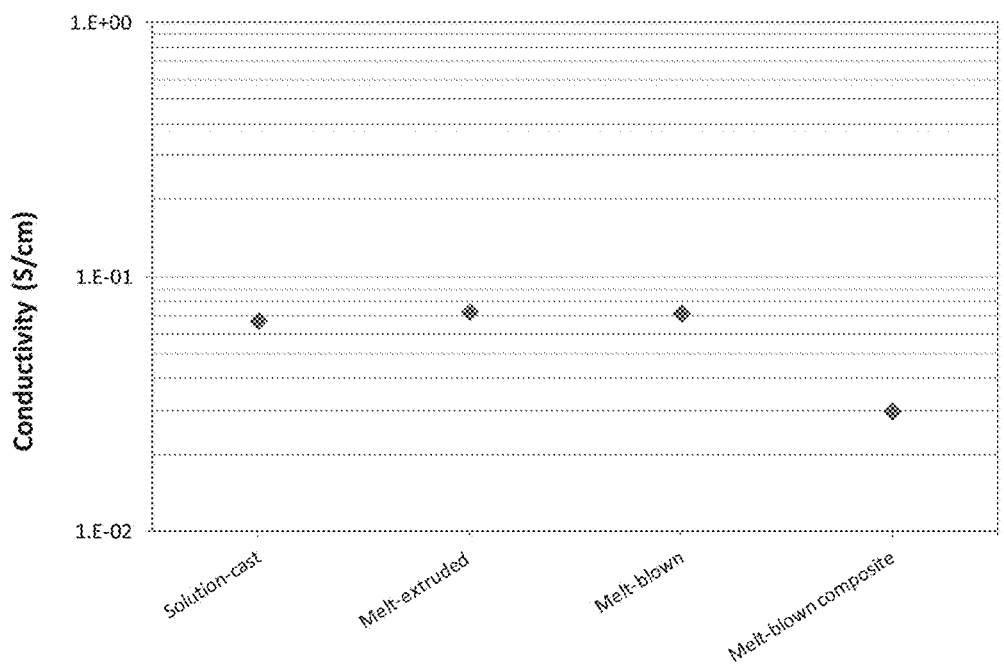
FIG. 8 is a graph depicting proton conductivity measured at room temperature in water for solution-cast NRE-211 membrane, and extruded and melt-blown Nafion™ R-1000 membranes.

After hydrolysis according to the protocol previously described, the proton conductivity of hydrated membranes were measured by impedance spectroscopy at room temperature in water. The results in FIG. 8 show that room temperature (RT) conductivity was not affected by the process used for membrane manufacturing, and was around $7 \cdot 10^{-2}$ S/cm. However, the incorporation of silica seems to slightly reduce the conductivity in water to $3 \cdot 10^{-2}$ S/cm, which is typical in nanocomposite membranes. The composite membranes are expected to excel at low relative humidity (RH), where the fillers have the ability to retain more water than the ionomeric polymer at higher temperature.

Figure 9:
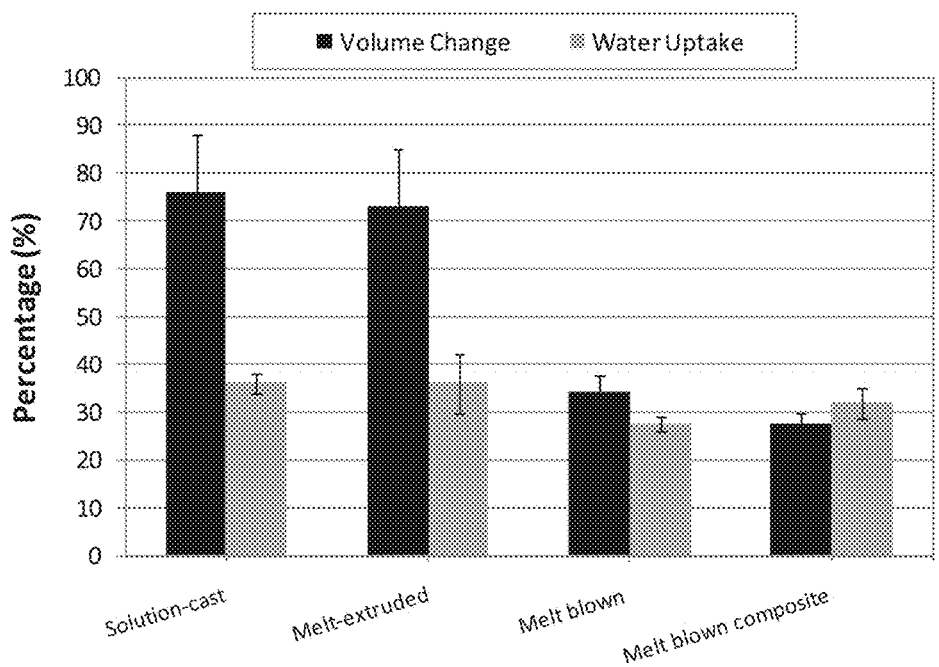
FIG. 9 is a graph depicting dry/wet water uptake (WU) and volume change (VC) measured for solution cast NRE-211 membrane, extruded and melt-blown Nafion™ R-1000 membranes, and the melt blown nanocomposite membrane of Example 2.

FIG. 9 shows water uptake (WU) and dry/wet volume change (VC) measured for solution-cast NRE-211 membrane, extruded membrane, melt-blown Nafion™ R-1000 membrane (Film 2), and melt blown nanocomposite membrane (Film 6). Membranes prepared by melt blowing show reduced water uptake and volume change compared to the NRE-211 solution-cast membrane and the extruded membrane. Thus, the process of the present invention produces ion exchange membranes with increased dimensional stability.

Example 5: Membrane-Electrode Assemblies

Membrane-electrode assemblies (MEA) were prepared by placing the membranes between two electrodes (0.4 mg Pt/cm² at the cathode and 0.1 mg Pt/cm² at the anode) and tested in fuel cell hardware with an active area of 25 cm². Testing was done at the facilities of the NRC-IFCI using a Scribner Associates test stand model: 850C. Hydrogen crossover was measured by cyclic voltammetry for melt-blown Nafion™ R-1000 membranes (Film 2) and NRE-211 solution-cast membranes. The limiting current densities for hydrogen oxidation at the cathode determined were 1.89 and 2.07 mA/cm², respectively, demonstrating that the membrane of the present invention has lower hydrogen permeability than the standard solution-cast membrane.

Figure 10:
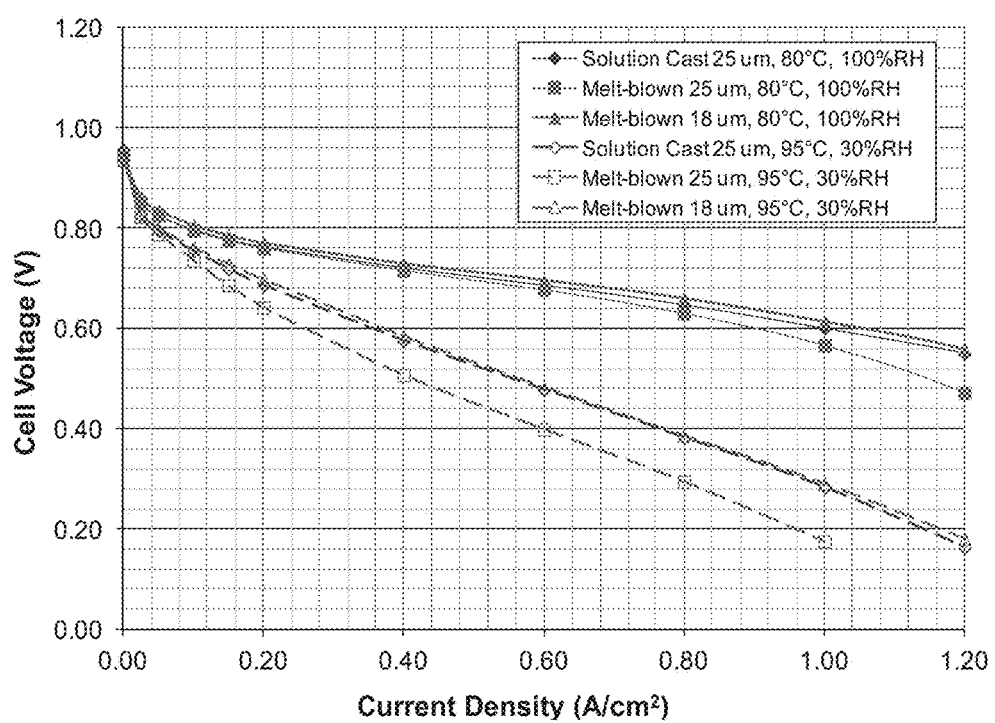
FIG. 10 is a graph presenting polarization curves obtained in a hydrogen/air fuel cell operated at 80° C./100% relative humidity (RH) and 95° C./30% RH measured for solution cast NRE-211 membrane, 25 and 18 microns melt-blown Nafion™ R-1000 membranes (Films 2 and 3); and, FIG. 11 is a graph showing polarization curves obtained in a hydrogen/air fuel cell operated at 95° C. and 30% RH measured for solution cast NRE-211 membrane, melt-blown Nafion™ R-1000 membranes (Film 2), and the melt-blown nanocomposite membrane (Film 6).
Figure 11:
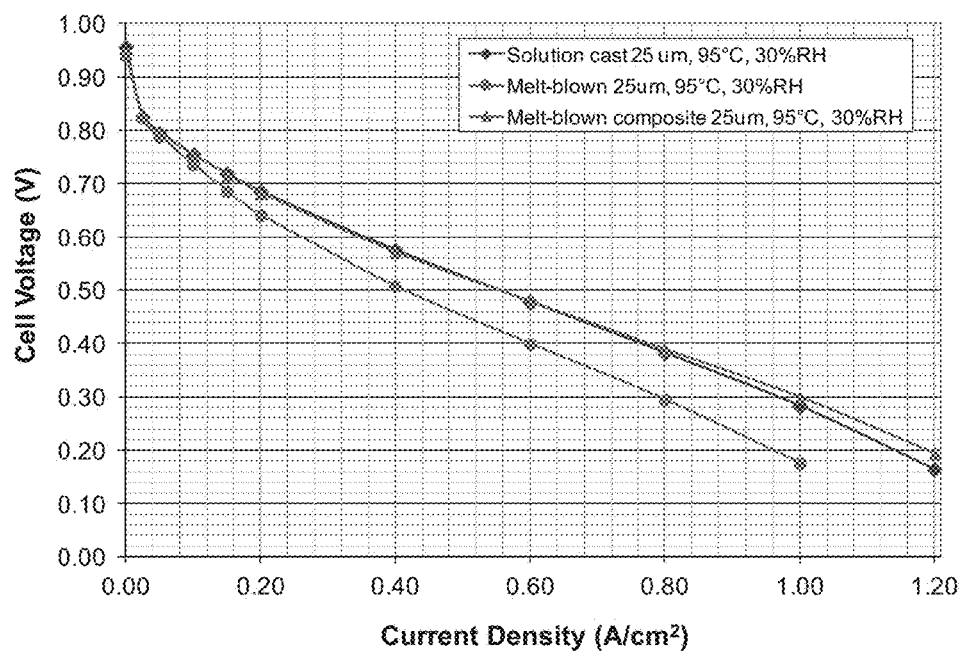

FIGS. 10 and 11 show I-V preliminary polarization curves measured for solution-cast NRE-211 membrane, melt-blown Nafion™ R-1000 membrane (Films 2 and 3), and melt blown nanocomposite membrane (Film 6). The results show that melt blown membranes have similar beginning of life (BOL) performance compared to NRE-211 reference, with a slightly improved performance for thin melt-blown membranes (18 microns) and the composite membrane, especially at high temperature and low RH conditions (95° C., 30% RH).

REFERENCES

The contents of the entirety of each of which are incorporated by this reference.

Giuffrida A. (1994) Heterogeneous Ion Exchange Materials Comprising Polyethylene of Linear Low Density or High Density High Molecular Weight. U.S. Pat. No. 5,346,924 issued Sep. 13, 1994.

Hasegawa T, Inoue Y. (2007) Ion Exchange Fluorocarbon Resin Membrane. U.S. Pat. No. 7,160,926 issued Jan. 9, 2007.

Howard E. (2009) Solid Polymer Membrane for Fuel Cell With Polyamine Imbibed Therein for Reducing Methanol Permeability. U.S. Pat. No. 7,534,516 issued May 19, 2009.

Kato H. (2003) Ion Exchange Assembly for an Electrochemical Cell. United States Patent Publication US 2003/0152820 published Aug. 14, 2003.

Kinoshita S. (2009) Membrane/Electrode Assembly for Polymer Electrolyte Fuel Cells and Polymer Electrolyte Fuel Cell. United States Patent Publication US 2009/0246592 published Oct. 1, 2009.

Lai Y-H, Mittelsteadt C K, Gittleman C S, Dillard D A. (2009) Viscoelastic Stress Analysis of Constrained Proton Exchange Membranes Under Humidity Cycling. *Journal of Fuel Cell Science and Technology.* 6(2), 021002-1 to 021002-13.

Lavoie P-A, Laliberte R, Dube J, Gagnon Y. (2010) Co-Extrusion Manufacturing Process of Thin Film Electrochemical Cell for Lithium Polymer Batteries and Apparatus Therefor. U.S. Pat. No. 7,700,019 issued Apr. 20, 2010.

Miyake N, Hasegawa T. (2006) Ion-Exchange Resin Membrane and Method for Producing the Same. U.S. Pat. No. 7,037,949 issued May 2, 2006.

Nishihata N, Tada M. (2006) Separator for Solid Polymer Fuel Cells, and Production Process Thereof. U.S. Pat. No. 7,128,996 issued Oct. 31, 2006.

Oren Y, Freger V, Kedem O, Linder C, Korin E. (2005) Highly Conductive Ordered Ion Exchange Membranes. United States Patent Publication US 2005/0238937 published Oct. 27, 2005.

Oren Y, Freger V, Kedem O, Linder C, Korin E. (2010) Highly Conductive Ordered Ion Exchange Membranes. U.S. Pat. No. 7,740,967 issued Jun. 22, 2010.

Rajendran R G. (2007) Process for Making Cation Exchange Membranes with Reduced Methanol Permeability. United States Patent Publication US 2007/0031716 published Feb. 8, 2007.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. An ion exchange resin membrane or an ion exchange precursor resin membrane having a thickness of 25 microns or less and having an orientation ratio of 1.5 or less.

2. The membrane according to claim 1, wherein the thickness is in a range of 3-25 microns.

3. The membrane according to claim 1, wherein the thickness is in a range of 5-25 microns.

4. The membrane according to claim 1, which is biaxially oriented.

5. The membrane according to claim 1, wherein the orientation ratio is in a range of 1 to 1.5.

6. The membrane according to claim 1, having a dimensional stability expressed as a wet/dry volume change of 75% or less.

7. The membrane according to claim 6, wherein the wet/dry volume change is in a range of 27% to 75%.

8. The membrane according to claim 6, wherein the wet/dry volume change is in a range of 27% to 35%.

9. The membrane according to claim 1, wherein the thickness is in a range of 5-25 microns; the membrane is biaxially oriented with an orientation ratio in a range of 1 to 1.5; and the membrane has a dimensional stability expressed as a wet/dry volume change of 75% or less.

10. The membrane according to claim 1, adapted for use in an energy conversion electrochemical device, an electrolyzer, a separation process, a sensor, or a fuel cell.

11. The membrane according to claim 1, adapted for use as an electrolyte in a proton exchange membrane fuel cell (PEMFC).

* * * * *